(12) United States Patent
Munger et al.

(10) Patent No.: US 7,039,571 B1
(45) Date of Patent: May 2, 2006

(54) METHOD FOR PROGRAMMING OPERATOR SYSTEM INTERFACE WITH A SIMULATOR

(75) Inventors: Robert J. Munger, Endwell, NY (US); Nathaniel H. Jennings, Apalachan, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/468,617

(22) Filed: Dec. 21, 1999

(51) Int. Cl.
*G06F 17/50* (2006.01)
*G06F 9/00* (2006.01)
*G09B 19/16* (2006.01)
*G09B 9/08* (2006.01)
*G05B 11/01* (2006.01)

(52) U.S. Cl. .................. 703/13; 434/30; 700/17; 715/771; 715/700

(58) Field of Classification Search .............. 717/130, 717/135, 125, 125 U, 135 U, 130 U; 345/961, 345/970, 762, 419–441, 27–41, 771, 771 U, 345/762 U; 434/49, 30; 703/13; 700/3, 700/17, 17 U; 715/700–865
See application file for complete search history.

(56) References Cited

U.S. PATENT DOCUMENTS

| | | | | |
|---|---|---|---|---|
| 4,573,925 A | * | 3/1986 | Styers ........................ | 434/49 |
| 4,587,630 A | * | 5/1986 | Straton et al. .............. | 715/823 |
| 4,845,665 A | * | 7/1989 | Heath et al. ................ | 703/21 |
| 4,853,888 A | * | 8/1989 | Lata et al. .................. | 345/172 |
| 4,939,507 A | * | 7/1990 | Beard et al. ................ | 345/156 |
| 4,967,386 A |   | 10/1990 | Maeda et al. .............. | 703/17 |
| 5,187,788 A |   | 2/1993 | Marmelstein ............... | 717/109 |
| 5,210,837 A |   | 5/1993 | Wiecek ...................... | 717/104 |
| 5,249,121 A | * | 9/1993 | Baum et al. ................ | 606/1 |
| 5,261,037 A |   | 11/1993 | Tse et al. ................... | 706/60 |
| 5,270,931 A | * | 12/1993 | Appleford .................. | 701/3 |
| 5,286,202 A | * | 2/1994 | de Gyarfas et al. ......... | 434/43 |
| 5,485,600 A |   | 1/1996 | Joseph et al. .............. | 703/13 |
| 5,603,034 A |   | 2/1997 | Swanson ................... | 717/111 |
| 5,607,306 A | * | 3/1997 | Bothwell .................... | 434/29 |
| 5,630,131 A |   | 5/1997 | Palevich et al. ............ | 717/108 |
| 5,632,622 A | * | 5/1997 | Bothwell .................... | 434/29 |
| 5,652,869 A |   | 7/1997 | Herdeg et al. .............. | 703/23 |
| 5,732,277 A | * | 3/1998 | Kodosky et al. ............ | 717/125 |
| 5,734,863 A | * | 3/1998 | Kodosky et al. ............ | 703/27 |
| 5,768,567 A | * | 6/1998 | Klein et al. ................. | 703/13 |
| 5,781,776 A |   | 7/1998 | Johnston et al. ............ | 717/130 |
| 5,790,760 A |   | 8/1998 | Arima ........................ | 706/45 |
| 5,802,370 A |   | 9/1998 | Sitbon et al. ............... | 717/102 |
| 5,807,109 A | * | 9/1998 | Tzidon et al. .............. | 434/35 |
| 5,844,554 A | * | 12/1998 | Geller et al. ............... | 345/744 |

(Continued)

OTHER PUBLICATIONS

Microsoft Press Computer Dictionary; 1997, published by Microsoft Press, p. 237.*

(Continued)

*Primary Examiner*—Paul L. Rodriguez
*Assistant Examiner*—Dwin M. Craig
(74) *Attorney, Agent, or Firm*—Whitham, Curtis, Chrisofferson & Cook, PC

(57) ABSTRACT

A process that takes converted system software code as input to a program created with a commercial compiler to produce a simulated Operator System Interface. An Operator System Interface is produced using program data structures rather than extensive emulation or updating of program source code. These files can then be modified or updated and converted back to both drive the system software and the Software Specification. This eliminates extensive manpower intensive emulation, and significantly reduces update work on actual system source code.

10 Claims, 7 Drawing Sheets

U.S. PATENT DOCUMENTS

| | | | |
|---|---|---|---|
| 5,845,119 A | 12/1998 | Kozuka et al. | 717/107 |
| 5,872,974 A | 2/1999 | Mezick | 717/109 |
| 5,883,639 A * | 3/1999 | Walton et al. | 345/473 |
| 5,920,312 A | 7/1999 | Wagner et al. | 345/763 |
| 6,118,445 A * | 9/2000 | Nonomura et al. | 345/723 |
| 6,124,855 A * | 9/2000 | Sells | 345/866 |
| 6,148,241 A * | 11/2000 | Ludtke et al. | 700/83 |
| 6,157,936 A * | 12/2000 | Mutschler, III et al. | 707/513 |
| 6,175,363 B1 * | 1/2001 | Williams et al. | 345/746 |
| 6,330,007 B1 * | 12/2001 | Isreal et al. | 345/762 |
| 6,452,612 B1 * | 9/2002 | Holtz et al. | 345/723 |

OTHER PUBLICATIONS

Pencikowski, Paul, "Advanced Crew Station Integration Cockpit", IEEE 1990, pp. 545-548.*

* cited by examiner

| Operator Name | Key Name | Key Availability | Key Legend Number | Controls Mode | Keyset Mode Active | Keyset Menu Active | Blank Legend State | Function Active | CH CSAR | Registered Receiver Control | Registered Receiver Name |
|---|---|---|---|---|---|---|---|---|---|---|---|
| Pilot | No_Key | 1 | 0 | None | 0 | 0 | 0 | 0 | 0 | 1 | Cad_Alert |
| Copilot | No_Key | 1 | 0 | None | 0 | 0 | 0 | 0 | 0 | 1 | Cad_Alert |
| SO | No_Key | 1 | 0 | None | 0 | 0 | 0 | 0 | 0 | 1 | Cad_Alert |
| Pilot | A_Scan | 0 | 27 | None | 0 | 0 | 0 | 0 | 0 | 2 | Cad_Alert Mmr_Wkst |
| Copilot | A_Scan | 0 | 27 | None | 0 | 0 | 0 | 0 | 0 | 2 | Cad_Alert Mmr_Wkst |
| SO | A_Scan | 0 | 27 | None | 0 | 0 | 0 | 0 | 0 | 2 | Cad_Alert Mmr_Wkst |
| Pilot | Ack | 1 | 0 | None | 0 | 0 | 1 | 0 | 0 | 1 | Cad_Alert |
| Copilot | Ack | 1 | 0 | None | 0 | 0 | 1 | 0 | 0 | 1 | Cad_Alert |
| SO | Ack | 1 | 0 | None | 0 | 0 | 1 | 0 | 0 | 1 | Cad_Alert |
| Pilot | Acst_Rcv | 0 | 28 | None | 0 | 0 | 0 | 0 | 0 | 1 | Cad_Alert |
| Copilot | Acst_Rcv | 0 | 28 | None | 0 | 0 | 0 | 0 | 0 | 1 | Cad_Alert |
| SO | Acst_Rcv | 0 | 28 | None | 0 | 0 | 0 | 0 | 0 | 1 | Cad_Alert |

*Figure 4*

METHOD FOR PROGRAMMING OPERATOR SYSTEM INTERFACE WITH A SIMULATOR

BACKGROUND OF THE INVENTION

1. Field of the Invention

The present invention generally relates to user interfaces to simulation software and, more particularly, to a process that takes converted system software code as input to a program created with a commercial compiler to produce a simulated Operator System Interface.

2. Background Description

In modern, highly integrated aircraft there normally is found a complicated Operator System Interface (OSI) utilizing both a programmable keyset and multi function display (MFD). For example, the Multi-Mission Helicopter (MMH) employs I/0 (input/output) devices such as programmable keysets and Multi Function Displays. In the MMH it is necessary to program both keyset layering and requisite menus for system and menu control. Specific keys access menus, other key layers or functions. Other aircraft system solutions could use a combination of an application specific softkey hierarchy and Central Display Unit (CDU) for data entry and system control, but the basic approach would not be changed.

In the past, a great deal of computer code had to be written to create and maintain these functions, and changes were expensive as the design moved through the development process. In order to achieve accurate representation of the operational system, extensive emulation was needed, or actual source code had to be used. Without simulation, or emulation in some form, Control and Display (C&D) software development can be imperfectly matched to end objectives since intricate keyset and window moding (e.g., displaying different modes on the MFD where different modes display different graphics, menus, etc.) and behavior is not evaluated until the software is in its final stages.

Previously, much of control and display (C&D) software development was forced to rely on anecdote and word of mouth to determine fit and function relating to the user's requirements. Currently, the lack of specific written guidance on window moding and behavior exposes the likelihood that an imperfect interpretation of a C&D system will be made (i.e., actual requirements not detected early in development). This is inherently counter-productive to the end objective. This lack of an easy ability to prototype the OSI often results in the final coded system that does not fully correspond to, or map to, the users' requirements.

During the build up to Airborne Low Frequency Sonar (ALFS) solo flight testing, there are unique aircrew training requirements in order to prepare crews for the first flight, and likewise, follow-on development testing (DT) and operational testing (OT) will generate very similar needs. Because OSI proficiency is expected to be quite perishable, a basic simulator is required to maintain an adequate knowledge level between the initial training and actual flight events. With the transition to new keysets, and the conduct of ALFS solo flight test using the legacy keyset and DT/OT with production models, it is important to maximize the ease and efficiency with which the program converts between old and new versions.

The Controls and Display (C&D) interface is complex with intricately interwoven moding, behaviors and functionality. The OSI Trainer is required to refresh those skills that are needed to complete the intended testing schedule. In order to maximize the refresher training value a representative, graphical, interactive tool is required. It must be easily upgraded to stay abreast of frequent design changes in a dynamic developmental environment.

SUMMARY OF THE INVENTION

It is therefore an object of the invention to provide a generic simulation environment (with an application specific front end) that can be run on a Windows 95/98/NT™ workstation, or other personal computer, for the purpose of developing an operator system interface. The present invention responds to the urgent requirement to tap into the actual code and translate the implemented OSI into a format that is capable of being run on any Windows™ 95/98/NT workstation for both training and evaluation. In doing so, the user interface is able to get the type of scrutiny needed for reduced risk during deployment. In the long term, such an approach would provide an easy path to an ideal desk top trainer which is tied to the largest segment of actual code reuse reasonable. This simulated operator system interface is used to train personnel in operation of custom keysets and menus, as well as for prototyping and software development of modified or new keysets.

It is another object of the invention to provide a process by which the Software Requirements Specification (SRS) tables defining key layering, keysets, key moding, menu changes, etc. are automatically generated, virtually eliminating multiple sources of error, and speeding the development process.

According to the invention, source code of an operational OSI is plugged directly into a conversion program, or "wrapper", that takes the operational source code and converts it into input files for the OSI Trainer files and converts them into operational source code. Code developed using the "wrapper" plugs directly into the operational software; therefore, dual configuration management requirements of an independent program are avoided. This advantage of the present invention which uses the actual Control and Display (C&D) code eliminates the expected discrepancies between the operational software and the simulation over the life of a program.

In the preferred embodiment, a simulation environment in a desk top computing environment is used to develop the operator system interface. Existing Avionics Operation Program (AOP) Ada language software tables are read into the simulator to define the keysets that the operator sees during the simulation/training. The tables can be modified in the simulator to output new tables in order to prototype a new operator system interface. Consequently, the software developer can use the simulator to create code tables rather than having to write new code. Also, the simulator is coded using parts of the AOP data structure and converts it for simulation. Simulation code can then be reconverted to AOP tables for configuring new key assignments and MFD menus in the operational system.

The process starts by taking existing code, for example the Multi-Mission Helicopter (MMH) AOP Ada language software data structures, and converting it into input files for the simulator which would then replicate the actual system software behavior. An operator could use this customized simulator for training for the MMH C&D. The input files could be easily modified by a developer to reflect proposed key moding and menu changes, run under the simulation to verify design, then converted directly into the same computer language code which was drawn from the system software. Thus enabling the operational system to be reprogrammed directly from the tables generated by the simulation prototype. The tables can then be output in an easy to read format that can be easily imported into a Software Requirement Specification, if necessary, for the targeted application.

This provides an efficient, convenient method of moving specific key legends/functions to other matrix or tree locations and allows new logic that controls key availability/activation (and eventually Window/Menu behavior) based on Operator Keyset and Window/Menu selections. The intent here is to allow interim growth in functionality prior to adopting a complete mission module by using a socket type architecture that allows implementation/modification of specific key functionality.

BRIEF DESCRIPTION OF THE DRAWINGS

The foregoing and other objects, aspects and advantages will be better understood from the following detailed description of a preferred embodiment of the invention with reference to the drawings, in which:

FIG. 4 shows an example of an excerpted data table defining a simulated keyset;

DETAILED DESCRIPTION OF A PREFERRED EMBODIMENT OF THE INVENTION

Figure 1:
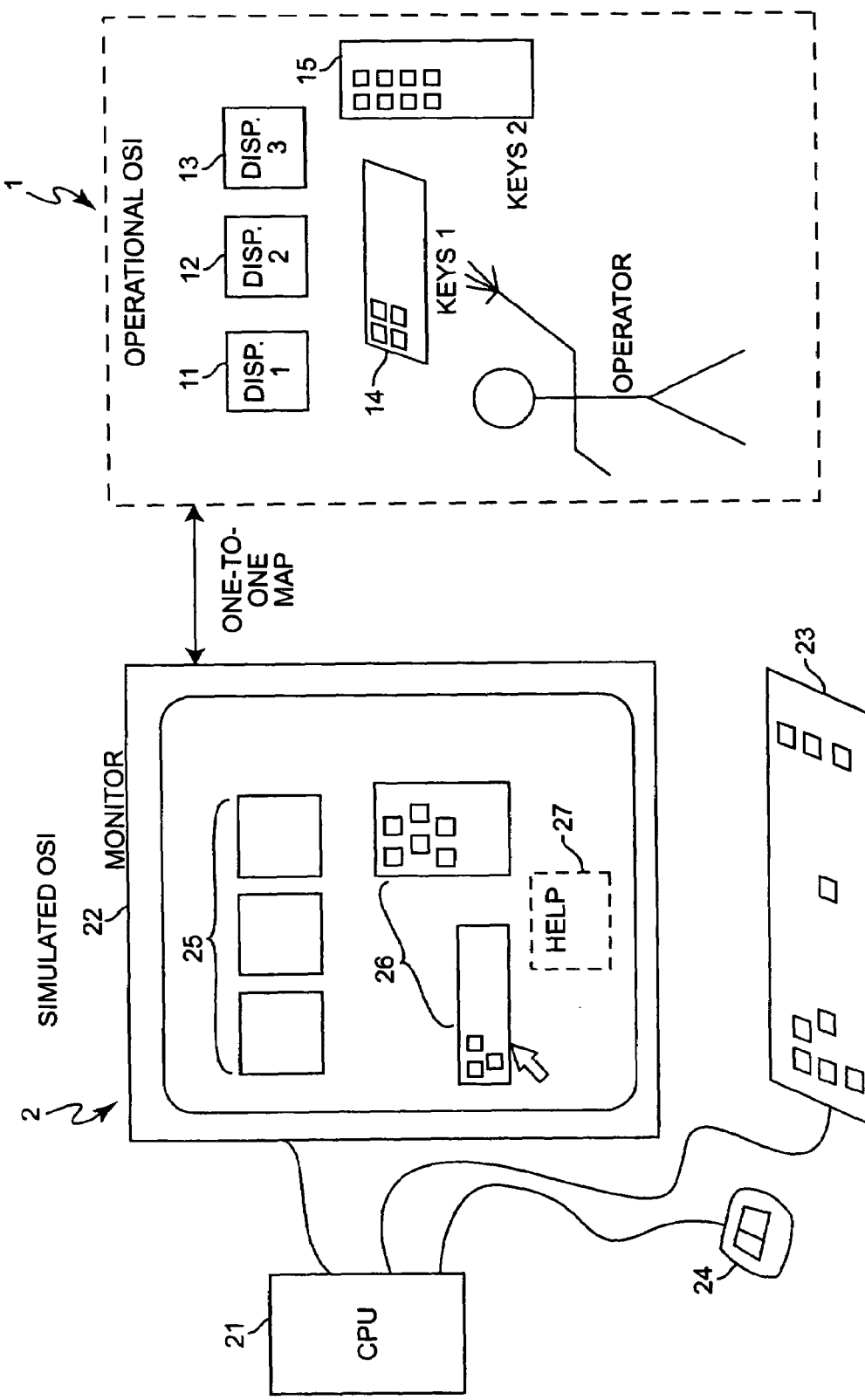
FIG. 1 shows a mapping of the operational OSI to the simulated OSI.

Referring now to the drawings, and more particularly to FIG. 1, there is shown a one-to-one mapping of the operational Operator System Interface (OSI) 1 to the simulated OSI 2. The actual operational system comprises a set of displays 11, 12 and 13 and a number of keypads 14 and 15. The simulated OSI 2 comprises a Central Processing Unit (CPU) 21 running the simulation software, a display device or monitor 22, a keyboard or other input device 23 and a mouse or other pointing device 24. The control and display components of the operational OSI are represented in the simulated OSI 2 on the monitor 22. The displays 11, 12 and 13 are represented as a simulated set of displays 25. The keysets 14 and 15, are represented as a simulated set of keys 26. A help window 27 is also displayed to facilitate operator training.

In the preferred embodiment of the present invention, re-utilization of Avionics Operation Program (AOP) code is maximized to facilitate an efficient Control and Display (C&D) software design and testing capability. The capability to plug in mission modules to provide improved Inverse Synthetic Aperture Radar (ISAR), Airborne Low Frequency Sonar (ALFS), Forward Looking Infrared Receiver (FLIR) functionality (with a Part Task Trainer the logical end product) is maintained.

The preferred embodiment of the present invention describes a software program that wraps around critical Control and Display (C&D) portions of the Avionics Operation Program (AOP) and allows basic operator interaction with actual AOP software. The preferred embodiment runs on a Windows NT™ machine, thereby allowing direct growth to a Fleet Desk Top and Part Task Trainer. A Fleet Desk Top Trainer is a PC based program that represents a low level emulation of a human-machine interface for a specific avionics package, and a Part Task Trainer is a PC based program that represents a mid-level emulation of a human-machine interface for a specifics avionics package.

In alternative embodiments the entire AOP is wrapped, versus just the C&D interface, meaning that the whole AOP system code could be converted to run on a personal computer. This alternative would be more expensive and take longer to implement, but overall would provide a higher fidelity. Also required would be an additional low level stimulus, to represent existing hardware for the actual AOP. As other simulated modules are written (i.e., ALFS), they could be plugged in directly.

Figure 2:
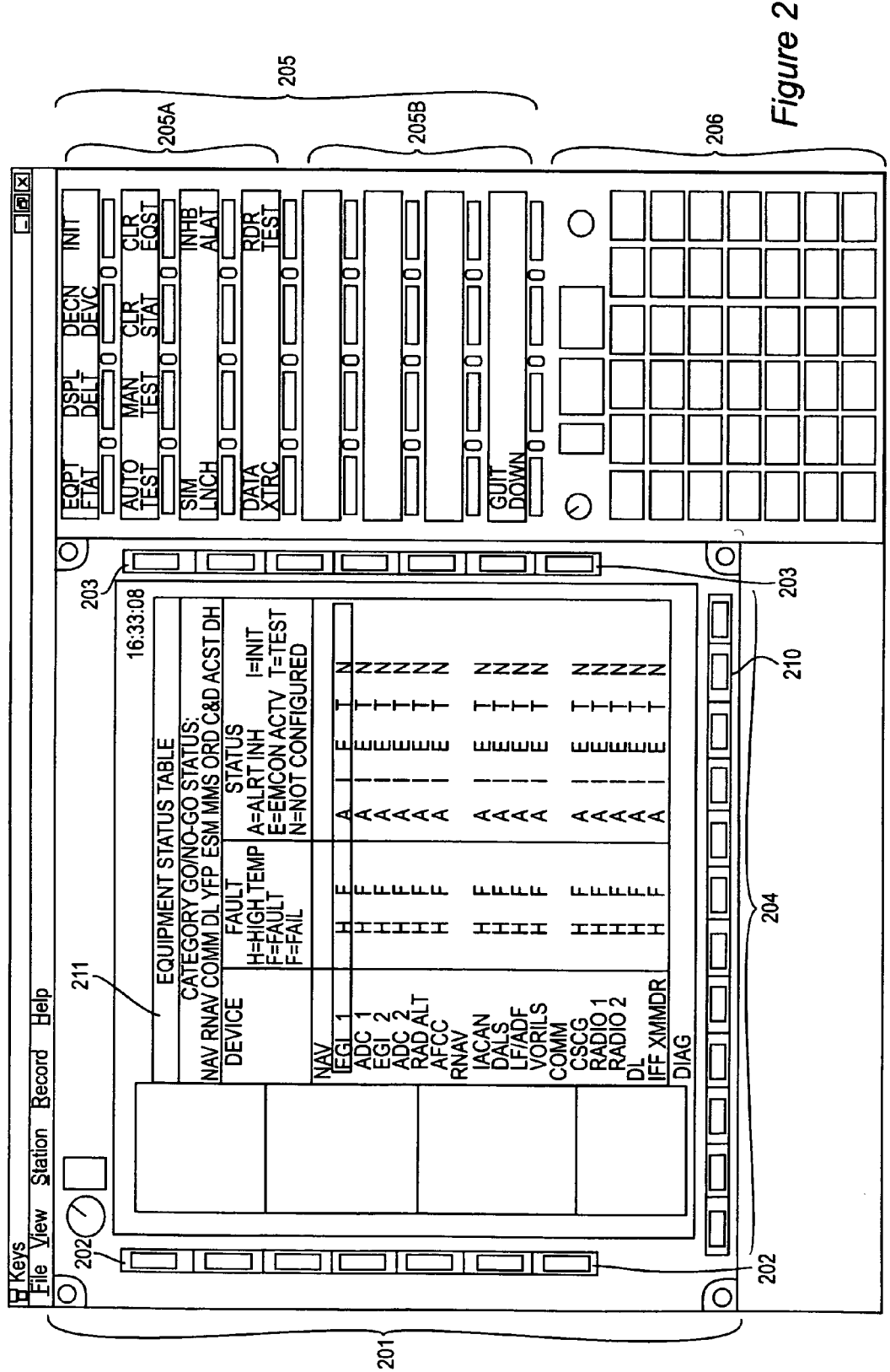
FIG. 2 shows an example of a multi function display with an implemented keyset, as an operator would see on the display of the monitor of a personal computer (PC) running the simulation.

Referring now FIG. 2, there is shown an example of a simulated multi function display with an implemented keyset, as an operator would see on the display of the PC running a simulation of an OSI, according the preferred embodiment of the invention. The MFD 201 is shown with an Equipment Status Table 211 being displayed on it. There are keys on the left 202, right 203, and bottom 204 of the MFD. Some of these keys are used to switch between major modes. For example, selecting the DIAG key 210 on the bottom row would display the Equipment Status Table 211 and would cause the programmable keys 205 to be remapped to what is shown in the Figure.

Figure 5:
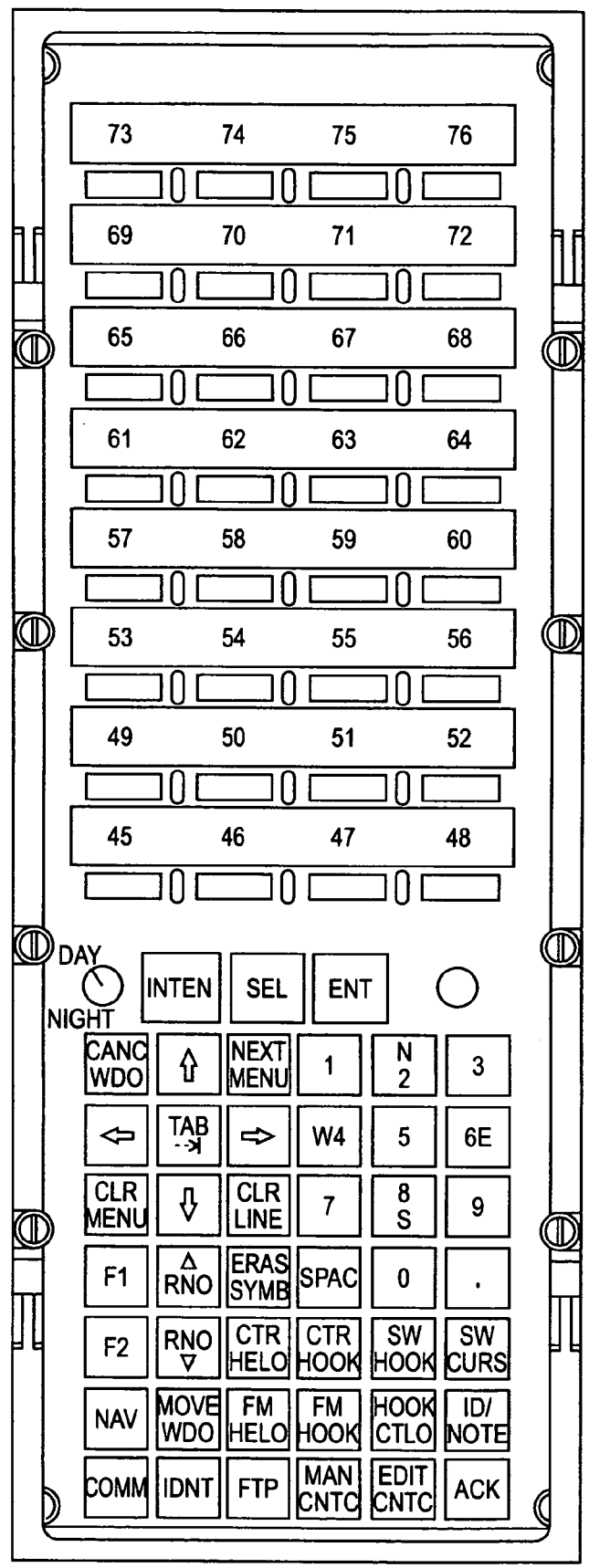
FIG. 5 shows the key numbering of the programmable keys in FIG. 2 as used by the Pilot or Copilot (Airborne Tactical Officer)
Figure 6:
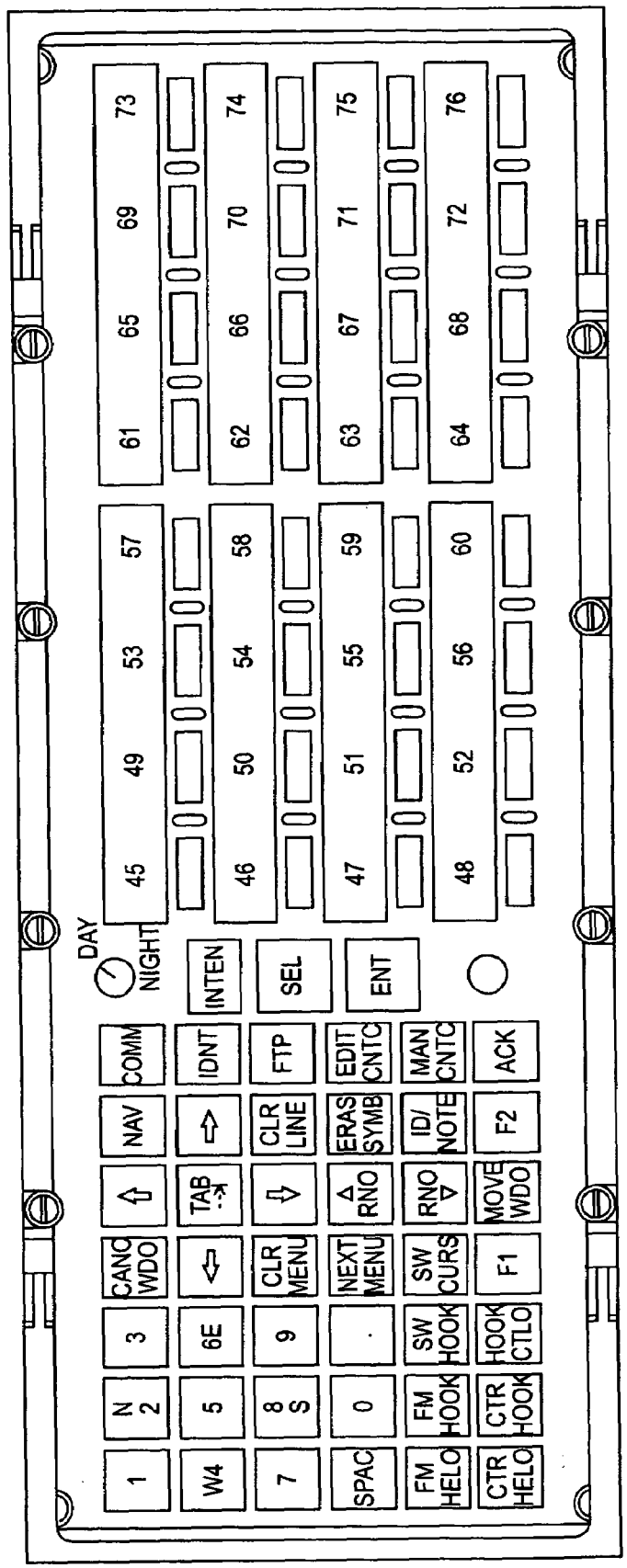
FIG. 6 shows the key numbering of the horizontal keyset as used by the Sensor Operator.

The Programmable Keys 205 are made up of two sets of 4-by-4 keys 205A and 205B for a total of 32 programmable keys. Each key can display a total of eight (8) characters for its legend. Selecting a programmable key may cause the programmable keys to have new character legends displayed on them, and/or display a menu on the MFD. The corresponding key numbering of the programmable keys 205 is shown in FIG. 5. FIG. 6 shows the key numbering of a horizontal keyset.

The fixed keys 206 are used to interact with the dynamic menus displayed on the MFD, change modes, or interact with the different modes selected.

An operational keyset is defined by specific attributes. These attributes must be accommodated by any keyset simulation. In order to better describe the preferred method of the present invention, certain terms are defined below. The following extracts from the Software Requirement Specification (SRS) for the MMH keyset will illustrate the kind of information that is contained in the Ada tables and OSI Simulator input files.

The keysets, mode changes, etc. are defined for the operational OSI in a series of data structures in Ada language code. The simulated OSI uses a series of tables with keywords with essentially the same data, but in a different format. Exemplary forms of these data structures, keywords and corresponding tables are described generally, below.

The Logical Names and Keyset Legends Table, as shown below, contains the definition of the Key Legend for each logical key that may be mapped to a keyset key. While the keysets limit the number of unique key legends to one, there may be more than one logical key associated with a legend.

TABLE 1

Logical Names and Keyset Legends Table.

| LOGICAL NAME | LEGEND TEXT | KEY-SET MODE | AYS? | BLANK LEGEND STATE SH CH CSAR | DEVICE AVAIL-ABILITY |
|---|---|---|---|---|---|
| 1 DCLT1 | DCLT 1 | | | | |
| 1 DCLT2 | DCLT 1 | | | | |

The Key Legend Configuration Number, as shown in Table 2, column 1, uniquely identifies the current set of Key Legend Text definitions that are stored on the Data Transfer System (DTS) or backup computer. The Key Table Column Definitions are the governing attributes for the keys.

1. Logical Key Name—The logical key name contains the name of the key used in the SRS.
2. Legend Text—The legend text defines the actual alphanumeric characters that are displayed on the physical key to which a logical key has been mapped.
3. Keyset Mode—This column indicates those keys whose purpose is as either a Keyset mode or Keyset menu indicated by KO and KE, respectively.
4. Are You Sure Menu Control (AYS?)—The added protection of asking for confirmation of requested action is made via activation of the "ARE YOU SURE?" Menu. This menu applies only to critical operations triggered with a key selection. The Keys which activate this mechanism are identified by this column.
5. Blank Legend State—This column designates keys that are not displayed on the indicated platform. This data accounts for keys that have no applicability on the platform and are not associated with a device Not a Configuration Option.
6. Device Availability—Device Availability defines the device and states for the device that will make the corresponding Key Unavailable.

The Device Availability column in this table accounts for the following instances:
a. A device becomes unavailable due to Initialization, Test, Deconfigure or I/O fail in the current display mode.
b. Cases where keys must be made unavailable and those keys associated with the device are also available in a display mode other than the display mode primarily associated with the device. RDR CTRL is an example. RDR CTRL is tied to the MMR device, however, RDR CTRL is a key found in the TACT display mode.
c. If Not a Configuration Option, then the Blank Legend State applies for the key.

The Device Availability column controls availability of the MFD display mode bezel keys based on the availability of the associated device. Thus, if a device availability is Initialization, Test, Not a Configuration Option, Deconfigured or I/O Fail at the time the operator selects its associated display mode bezel key, then a Function Unavailable ALERT is generated and the current display mode is maintained. The keys associated with the device are therefore never made available.

Keyset Modes and Keyset Menus both map logical key functions to physical programmable keys. However, their operation and applications differ substantially.

A keyset mode may define the mapping for any or all of the programmable keys on the keyset that it affects. Keyset modes that define the mapping for all of the programmable keys are referred to as Base Keyset Modes. Keyset modes are arranged in a hierarchical manner to allow the operator access to functions associated with the task at hand in convenient groupings. Keyset modes that are activated by a logical key are named the same as the key that activated them except with a tic(') between words rather than a space as is used in the logical key name. The key mapping defined by an active keyset mode shall only be applied to the physical keys when each keyset mode in the hierarchy above the active keyset mode is also active. The keyset mode names appear at the tops of the columns of logical keys that define each mode.

Keyset menus are not part of the keyset mode hierarchy. During the interval when a keyset menu is active, its mapping supersedes the active keyset modes but does not deactivate them. Keyset menus can be activated by key depression or by interaction with an on-screen menus or tables that require keypad functions in addition to those available on the fixed function keypad.

A number of rules for using and maintaining keyset mode templates is necessary, as defined below.

1. Set Up: By design, there is a Base Keyset Mode associated with each MFD and Horizontal Situation Display (HSD) mode that is identified. The base keyset modes provide definition for all of the programmable keys for each keyset on which that base level is allowed. (32 each on Airborne Tactical Officer (ATO), Sensor Operator (SO), and PILOT Keyset).

Note: Some of the keys on the base level may be defined as BLANK.

2. Transitions: By convention, the Keyset Mode name is the same as the Logical Key name that activated it. The explicit mapping of Logical Keys to Keyset Mode names is documented in the Logical Names and Keyset Legends Table, as shown in Table 1.
3. Keyset Mode Table Usage: The top row of a Keyset Mode table, as shown below, in Table 2, identifies the base keyset mode names. Subsequent rows define the hierarchy of keyset modes available from the base keyset mode. Keyset mode names appearing on the same row and under the same base keyset mode name are said to be at the same level in the keyset mode hierarchy.

A dash (-) in a column of the table indicates that that physical key will display the legend defined at the next higher level in the hierarchy.

An X in a column indicates that the key will display no legend (blank).

Availability constraints for the keyset Fixed Function keys and the MFD keys are contained in the Fixed Function table and the MFD Keys table, respectively (not shown). In these tables, key availability is shown versus keyset mode. One skilled in the art would understand how to construct these and other tables in order to practice the present invention.

Keys marked with a dash (-) are available, with the logical name shown. Keys marked "X" are unavailable.

4. Arbitration: Keyset modes at the same hierarchical level can be active simultaneously only if the keys defined by those modes are mutually exclusive. When conflicting physical key definitions arise as a result of a keyset mode being activated while other modes at the same level are active, the originally active keyset mode(s) which conflict shall be deactivated.

Keyset Modes may redefine the mapping to physical keys that are used by other keyset modes that are higher in the same hierarchy without invoking arbitration.

5. Maintaining OSI Integrity: When a logical key becomes unavailable, any on-screen menus, keyset menus or keyset modes that it controls are canceled and/or deactivated. When a logical key no longer maps to a physical key (deactivation of a keyset mode within the hierarchy which it resides), any on-screen menus, or keyset menus that it controls shall be canceled and/or deactivated.

Keyset menus are completely independent of the keyset mode hierarchies. An active keyset menu overrides the existing logical to physical key mapping without deactivating any of the keyset modes that have been overridden. In addition, when a keyset Menu transitions to active, the originally active Keyset Menu shall be deactivated.

Table 2 shows the Table Layout for keys in the keyset. The Keyset Modes table shows the mapping of the entire set of keyset keys defined by the AOP (logical keys) to the programmable key switches on each keyset (physical keys). These tables are arranged such that the current primary display mode is used to determine the correct table to start with. Once the correct table is found, the definitions and rules, as described above, can be used to determine the entire set of candidate logical keys for any combination of active keyset modes.

Referring to Table 2, the number in the key column is the two (2) digit switch number that will be sent from the keysets. In most cases, keyset legends are assigned to the same switch number in both the horizontal (SO) or vertical ATO) keyset configurations. Exceptions include the Fixed Function keys and the ID/NOTE alphabetic programmable keys.

The columns to the right of the switch number column(s) show the Keyset Mode names. The entries in the columns identify the logical key names for each switch number. Although the preferred embodiment uses a hierarchical data structure, as described above, for the MMH, it would be apparent to one skilled in the art how to practice the present invention with other operator system interface tables and create or modify a simulated OSI, accordingly.

TABLE 2

Keyset Modes.

| BASE LVL:1 LVL:2 | DIAG' MAIN | EQPT' STAT | WCA' |
|---|---|---|---|
| KEY 73 | EQPT STAT | — | X |
| 74 | X | DSPL DETL1 | X |
| 75 | X | DECN | X |
| 76 | RCVR STAT | INIT | X |
| 69 | X | TEST | X |
| 70 | X | MAN TEST | X |
| 71 | X | CLR STAT | X |
| 72 | X | CLR EQST | X |
| 65 | SIM LNCH | — | X |
| 66 | X | — | X |
| 67 | X | — | X |
| 68 | X | INHB ALRT | X |
| 61 | DATA XTRC | — | X |
| 62 | X | — | X |
| 63 | X | — | X |
| 64 | RDR TEST | — | X |
| 57 | X | — | X |
| ... | ... | | |
| 45 | SHUTDOWN | — | X |
| 46 | X | — | X |
| 47 | X | — | X |
| 48 | X | — | RETURN2 |

Figure 3:
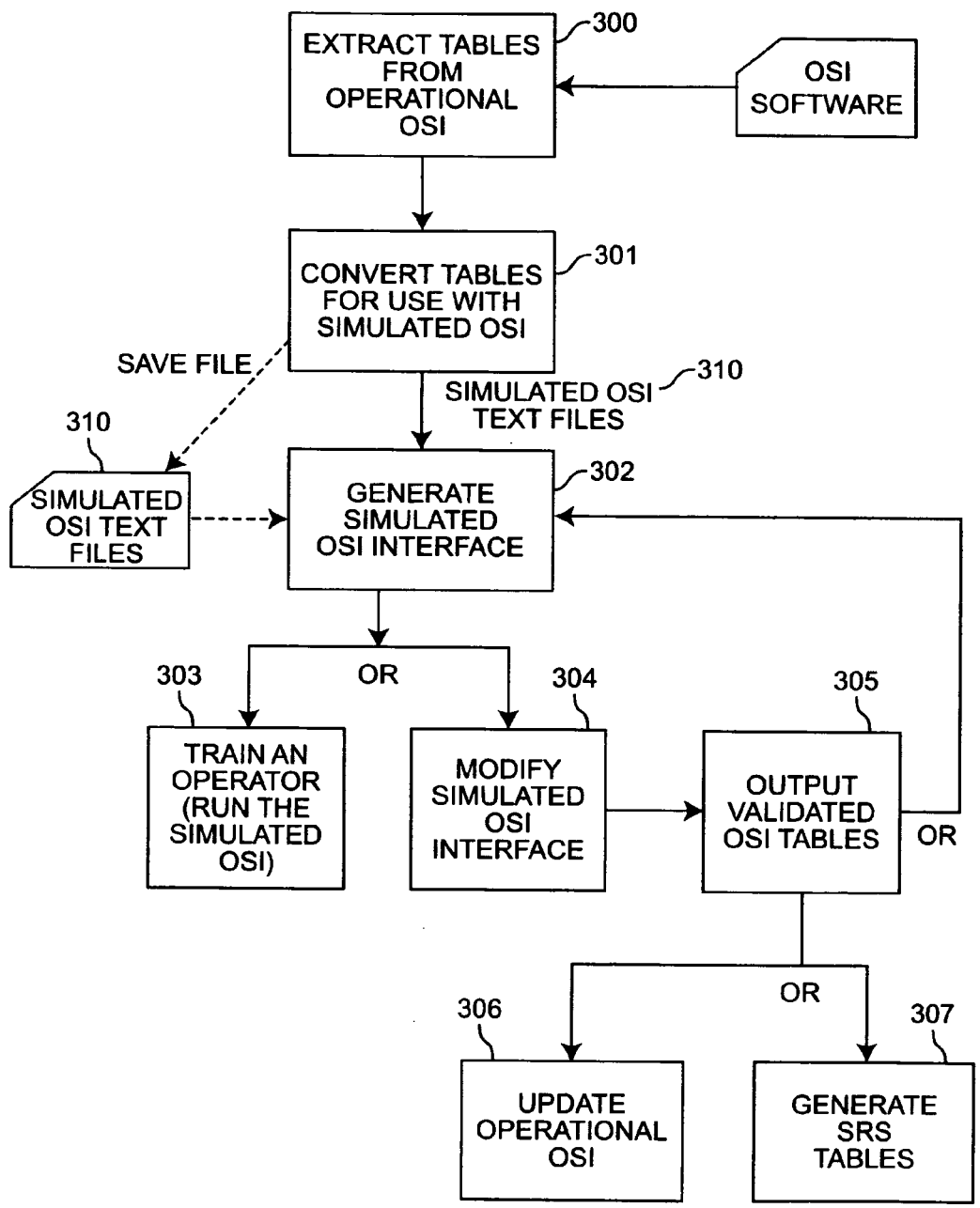
FIG. 3 shows a high level flow diagram of the method of the present invention.

FIG. 3 shows a high level flow diagram of the method of the present invention for creating a simulated OSI, according to the preferred embodiment of the invention. First, in function block 300 the Ada language software tables that define an operational system's C&D are extracted. The Ada language tables are read using a parser program. The preferred embodiment inputs the tables into a C language program that is designed to parse the source code. An excerpted example Ada table, cad_keyset_init_keys.a, for a core Operational OSI appears below. In-line comments are denoted by a preceding "--".

--- cad_keyset_init_keys.a

```
separate (Cad_Keyset)
function Init_Keys
        return Logical_Key_Data_Array_Type is
    --  Define the table to hold the logical key data for a
    --  keyset
    --  Cmnct.Cad_Alert is always to be the first of the
    --  Registered_Receivers
    --  so that Operator Action alert processing occurs
    --  correctly.
    Keys : constant Logical_Key_Data_Array_Type :=
        (Keys_Adt.No_Key =>
            (Key_Legend_Number       => 0,
             Legend_Attribute        => Key_Ut.Normal_Video,
             Blank_Legend_State      => Keys_Adt.Blank,
             Key_Availability        => Cat.Available,
             Function_Active         => False,
             Keyset_Menu_Active      => False,
             Keyset_Mode_Active      => False,
             Controls_Mode           => No_Mode,
             Registered_Receiver_Count => 1,
             Registered_Receivers    =>
                 (Cmnct.Cad_Alert, others  => Cmnct.No_Dest)),
        Keys_Adt.A_Scan =>
            (Key_Legend_Number       => 27,
             Legend_Attribute        => Key_Ut.Normal_Video,
             Blank_Legend_State      => Keys_Adt.Blank,
             Key_Availability        => Cat.Unavailable,
```

-continued

| cad_keyset_init_keys.a |
|---|
| Function_Active => False, |
| Keyset_Menu_Active => False, |
| Keyset_Mode_Active => False, |
| Controls_Mode => No_Mode, |
| Registered_Receiver_Count => 2, |
| Registered_Receivers => |
|   (Cmnct.Cad_Alert, Cmnct.Mmr_Wkst, |
|     others => Cmnct.No_Dest)), |
| Keys_Adt.Ack => |
|   (Key_Legend_Number => 0, |
|   Legend_Attribute => Key_Ut.Normal_Video, |
|   Blank_Legend_State => Keys_Adt.Non_Blank, |
|   Key_Availability => Cat.Available, |
|   Function_Active => False, |
|   Keyset_Menu_Active => False, |
|   Keyset_Mode_Active => False, |
|   Controls_Mode => No_Mode, |
|   Registered_Receiver_Count => 1, |
|   Registered_Receivers => |
|     (Cmnct.Cad_Alert, others => |
|               Cmnct.No_Dest)), |
| Keys_Adt.Acst_Rcv => |
|   (Key_Legend_Number => 28, |
|   Legend_Attribute => Key_Ut.Normal_Video, |
|   Blank_Legend_State => Keys_Adt.Blank, |
|   Key_Availability => Cat.Unavailable, |
|   Function_Active => False, |
|   Keyset_Menu_Active => False, |
|   Keyset_Mode_Active => False, |
|   Controls_Mode => No_Mode, |
|   Registered_Receiver_Count => 1, |
|   Registered_Receivers => |
|     (Cmnct.Cad_Alert, others => Cmnct.No_Dest)), |
| . |
| . |
| . |

For the logical keys found after the appropriate keyword Keys_Adt, for instance, Keys_adt.No_key and Keys_Adt.A_Scan, found in the Operational OSI Ada table cad_keyset_init_keys.a, as shown above, the following attributes are defined.

Key_Legend_Number is an index in another file that contains the eight (8) character legend that will go on the programmable key.

Legend_Attribute of normal video just tells the system that the letters are put on a black background.

Blank_Legend_State will be set to blank if the key is not in the system.

Key_Availability defines whether the key will be available or not depending on certain devices.

Function_Active if true, activates a function when pressed.

Keyset_Menu_Active if true, brings up a menu on the MFD when pressed.

Keyset_Mode_Active if true, remaps the programmable keys when pressed.

Controls_mode if other than No_Mode, it controls another layer of keys.

Registered_Receiver_Count is the count of registered receivers.

Registered_Receivers is who gets notified of a key depression.

FIG. 4 shows a table representation of the data from an OSI Simulator file C&DKeysetInitKeys.txt. This file is created from the Operational OSI Ada table cad_keyset_init_keys.a. If the file C&DKeysetInitKeys.txt is modified and if a new Operational OSI Ada table is desired, a file is generated called cadKeysetInitKeys.tmp which has the same format as cad_keyset_init_keys.a.

One thing to note is that the Operational OSI Ada table has one entry while the OSI Simulator file creates three (3) duplicate entries for each of the three (3) stations Pilot, Copilot for the vertical keyset (as shown in FIG. 2, 205 and 206) and SO (horizontal keyset as shown in FIG. 6). The OSI Simulator allows the operator to switch between stations. Data contained in the Operational OSI Ada table is carried in the OSI Simulator file even though the simulator may not use it so a new Operational OSI Ada table with all the necessary information from the OSI Simulator file may be produced in the future.

An example of parsing the cad_keyset_init_keys.a file with a C program would be first finding the appropriate keyword. An example of an appropriate keyword is Keys_Adt. Once this keyword is found all the information for the key is retrieved. For example after Keys_Adt the logical key name A_Scan is found and all the following data is for the logical key A_Scan. This information is then translated into the file C&DKeysetInitKeys.txt, as shown in FIG. 4. Referring now to FIG. 4, an excerpted example simulated data table is shown. The Operator Name column 401 indicates which key is seen for a specific operator, for instance, a pilot, co-pilot, or Sensor Operator (SO). One can see at 403, the Key_Legend_Number is 27 for A_Scan at 402 and is translated into the file C&DKeysetInitKeys.txt under the column Key Legend Number 404.

An excerpted example key modes definition table appears below. This table contains the keyset mode data for all operators.

```
cad_keyset_init_cfg.a
```

```
separate (Cad_Keyset)
function Init_Keyset_Modes
        (Operator : in   Cat.Operator_Type)
        return Keyset_Mode_Data_Array_Type is
    use Cat;
    -- Define a table to contain the keyset mode data for all
operators
    Keyset_Modes_Table : Keyset_Mode_Data_Array_Type :=
Acoustic_Analysis =>
            (Controlled_By =>
                Keys_Adt.No_Key,
            Level =>
                Base,
            Configuration =>
                (73      => Keys_Adt.Blank_Key,
                 74      => Keys_Adt.Dip_Dspl,
                 75      => Keys_Adt.Geo_Disp,
                 76      => Keys_Adt.Buoy_Dspl,
                 69      => Keys_Adt.Blank_Key,
                 70      => Keys_Adt.Dip_Prcs,
                 71      => Keys_Adt.Blank_Key,
                 72      => Keys_Adt.Buoy_Prcs,
                 65      => Keys_Adt.Blank_Key,
                 66      => Keys_Adt.Blank_Key,
                 67      => Keys_Adt.Blank_Key,
                 68      => Keys_Adt.Blank_Key,
                 61      => Keys_Adt.Blank_Key,
                 62      => Keys_Adt.Blank_Key,
                 63      => Keys_Adt.Blank_Key,
                 64      => Keys_Adt.Blank_Key,
                 57      => Keys_Adt.Blank_Key,
                 58      => Keys_Adt.Blank_Key,
                 59      => Keys_Adt.Blank_Key,
                 60      => Keys_Adt.Blank_Key,
                 53      => Keys_Adt.Blank_Key,
                 54      => Keys_Adt.Blank_Key,
                 55      => Keys_Adt.Blank_Key,
                 56      => Keys_Adt.Blank_Key,
                 49      => Keys_Adt.Blank_Key,
                 50      => Keys_Adt.Blank_Key,
                 51      => Keys_Adt.Blank_Key,
                 52      => Keys_Adt.Blank_Key,
                 45      => Keys_Adt.Blank_Key,
                 46      => Keys_Adt.Blank_Key,
                 47      => Keys_Adt.Blank_Key,
                 48      => Keys_Adt.Blank_Key),
            Modifies_Fixed_Keys =>
                True,
            Fixed_Keys =>
                (Comm        => Keys_Adt.Comm,
                 Ctr_Helo    => Keys_Adt.Ctr_Helo5,
                 Ctr_Hook    => Keys_Adt.Ctr_Hook5,
                 Dec_Rng     => Keys_Adt.Dec_Rng,
                 Edit_Cntc   => Keys_Adt.Edit_Cntc,
                 From_Helo   => Keys_Adt.From_Helo,
                 From_Hook   => Keys_Adt.From_Hook5,
                 Ftp         => Keys_Adt.Ftp,
                 Hook_Ltlg   => Keys_Adt.Hook_Ltlg,
                 Id_Note     => Keys_Adt.Id_Note,
                 Inc_Rng     => Keys_Adt.Inc_Rng,
                 Man_Cntc    => Keys_Adt.Man_Cntc,
                 Nav         => Keys_Adt.Nav),
            Contains_Keyset_Mode_Control_Keys =>
                True,
            Keyset_Mode_Control_Key_Count =>
                5,
            Mode_Keys =>
                (1       => Keys_Adt.Dip_Dspl,
                 2       => Keys_Adt.Geo_Disp,
                 3       => Keys_Adt.Buoy_Dspl,
                 4       => Keys_Adt.Dip_Prcs,
                 5       => Keys_Adt.Buoy_Prcs,
                 6       => Keys_Adt.No_Key,
                 7       => Keys_Adt.No_Key,
                 8       => Keys_Adt.No_Key,
                 9       => Keys_Adt.No_Key,
                 10      => Keys_Adt.No_Key,
```

```
-continued
cad_keyset_init_cfg.a
```

```
                 11      => Keys_Adt.No_Key,
                 12      => Keys_Adt.No_Key),
            Contains_Keyset_Menu_Control_Keys =>
                False,
            Keyset_Menu_Control_Key_Count =>
                1,
            Menu_Keys =>
                (1       => Keys_Adt.No_Key,
                 2       => Keys_Adt.No_Key)),
            .
            .
            .
```

A brief overview of the information found in the above table which shows an excerpt of the cad_keyset_init_cfg.a Ada table is that the Acoustic Analysis key is not controlled by another key (Controlled_By is set to No_Key) and is a base mode (Level). The Configuration data tells what logical keys are mapped to the physical key numbers. FIG. 5 shows where physical key numbers are located. The Modifies_Fixed_Keys being True means that the fixed keys get a new logical definition in this mode. For example the fixed key Ctr_Helo would be logical key Ctr_Helo5 under Acoustic Analysis mode.

In this case, Contains_Keyset_Mode_Control_Keys is True and it contains five (5) modes, Dip_Dspl, Geo_Disp, Buoy_Dspl, Dip_Prcs and Buoy_Prcs. Depressing any of these five modes will remap the programmable keys for that mode. Contains Keyset_Menu_Control_Keys is false so Menu_Keys only contains No_Key for its Menu_Keys keys.

The Operational OSI Ada table cad_keyset_init_cfg.a, as shown above, is used to created the OSI Simulator keyset mode data file C&DKeysetInitCfg.txt, an excerpt of which is shown below.

```
C&DKeysetInitCfg.txt
```

```
MODE_START
Pilot No_Mode Base No_Key
0 0
0 0
73 No_Key
74 No_Key
75 No_Key
76 No_Key
69 No_Key
70 No_Key
71 No_Key
.
.
.
46 No_Key
47 No_Key
48 No_Key
M_FixedKeys 0
MODE_END
MODE_START
Copilot No_Mode Base No_Key
0 0
0 0
73 No_Key
74 No_Key
75 No_Key
76 No_Key
69 No_Key
.
.
.
```

-continued

C&DKeysetInitCfg.txt

```
52 No_Key
45 No_Key
46 No_Key
47 No_Key
48 No_Key
M_FixedKeys 0
MODE_END
MODE_START
Pilot Acoustic_Analysis Base No_Key
1 5 Dip_Dspl Geo_Disp Buoy_Dspl Dip_Prcs Buoy_Prcs
0 0
73 Blank_Key
74 Dip_Dspl
75 Geo_Disp
    .
    .
    .
45 Blank_Key
46 Blank_Key
47 Blank_Key
48 Blank_Key
M_FixedKeys 13
Comm Comm
Ctr_Helo Ctr_Helo5
Ctr_Hook Ctr_Hook5
Dec_Rng Dec_Rng
Edit_Cntc Edit_Cntc
From_Helo From_Helo
From_Hook From_Hook5
Ftp Ftp
Hook_Ltlg Hook_Ltlg
Id_Note Id_Note
Inc_Rng Inc_Rng
Man_Cntc Man_Cntc
Nav Nav
MODE_END
```

This table is a plain text file which can be parsed by keyword. Each OSI Station and Mode in the data file is separated by the KeyWords MODE_START and MODE_END. Data on the same line is separated by blanks. Line 2 of the table contains the Station Name, Mode Name, Level and Controlled by Mode Key, for instance:

Pilot Comm Lvl_1 Comm

The next line contains Mode Control keys. The first field identifies if this data is enabled, 0 for not enabled and 1 for enabled. It is enabled, and the second field identifies the count, of three (3). Thus, there are three modes following the count: Grd_Xmit Rad1_Ctrl, and Rad2_Ctrl.

1 3 Grd_Xmit Rad1_Ctrl Rad2_Ctrl

The next line contains Menu Control Keys. The first field identifies if this data is enabled, 0 for not enabled and 1 for enabled. It is not enabled so the count in field two is zero (0).

0 0

The next line is repeated for keys numbered 45 to 76, in any order, and contains the Physical Key number and the Logical Key Name, for instance:

45 Blank_Key 46 Blank_Key

The next line contains the keyword "M_FixedKeys" followed by the number of modified fixed keys, if greater than 0 will indicate number of lines containing the data of Fixed Key Name and Logical Name Assigned.

If C&DKeysetInitCfg.txt is modified a new Operational OSI Ada table is desired to be produced, a file called cadKeysetInitCfg.tmp is created which has the same format as cad_keyset_init_cfg.a.

Referring again to FIG. 3, the data is parsed in function block 301 and when keywords are found, the appropriate data is extracted and put into the appropriate OSI Trainer text files 310 for use in generating the simulator OSI interface in function block 302. An example of parsing the cad_keyset_init_cfg.a file with a C program would be first finding the appropriate keyword. An example of an appropriate keyword is Configuration. Once Configuration is found, it is known that the information following is what logical keys are assigned to the physical key number for that mode. One example would be for Acoustic Analysis after keyword Configuration. Key 73 is defined as Blank_Key, key 74 as Dip_Dspl, and so on. The corresponding entry in the OSI Simulator file C&DKeysetInitCfg.txt would show line 5 after the Keyword MODE_START for Acoustic Analysis as "73 Blank_Key", line 6 as "74 Dip_Dspl", and so on.

Alternatively, if no operational system exists, and this is the first prototype to be built, the OSI simulator text files 310 are created from scratch by a software developer and the process begins at function block 302.

The simulated OSI interface is generated in function block 302 from the tables 310, as described above. The simulator can now be used for several different processes. At this point, the simulated OSI can be run on a personal computer to train an operator or demonstrate the system as in function block 303. Because the simulated OSI uses tables generated directly from the operational system software, there is a one-to-one mapping of the keyset and MFD of the operational system to the simulated system.

In an alternative embodiment, the generated simulated OSI interface is used to develop prototypes of the OSI interface in function block 304. A prototyper can modify the OSI, output updated tables in the operational OSI format, in function block 305 and then re-generate the simulated OSI interface in function block 302. The prototyper just adds or modifies entries in the appropriate OSI Trainer input text files.

For example, it is desired to add a new logical key on the Acoustic Analysis Layer called ATAP on key number 71. To accomplish this, a prototyper adds an entry in the OSI Simulator file C&DKeysetInitKeys.txt that looks like the following:

Copilot ATAP 0 367 None 0 0 0 0 0 2 Cad_alert Mmr_Wkst

Then the entry in the file C&DKeysetInitCfg.txt is changed from

```
Acoustic_Analysis =>
            (Controlled_By =>
                Keys_Adt.No_Key,
            Level =>
                Base,
            Configuration =>
                (73 => Keys_Adt.Blank_Key,
                74 => Keys_Adt.Dip_Dspl,
                75 => Keys_Adt.Geo_Disp,
                76 => Keys_Adt.Buoy_Dspl,
                69 => Keys_Adt.Blank_Key,
                70 => Keys_Adt.Dip_Prcs,
                71 => Keys_Adt.Blank_Key,
                72 => Keys_Adt.Buoy_Prcs,
                65 => Keys_Adt.Blank_Key,
                    .
                    .
                    .
``` to the following new entry:

```
Acoustic_Analysis =>
            (Controlled_By =>
                Keys_Adt.No_Key,
            Level =>
                Base,
            Configuration =>
                (73 => Keys_Adt.Blank_Key,
                74 => Keys_Adt.Dip_Dspl,
                75 => Keys_Adt.Geo_Disp,
                76 => Keys_Adt.Buoy_Dspl,
                69 => Keys_Adt.Blank_Key,
                70 => Keys_Adt.Dip_Prcs,
                71 => Keys_Adt.ATAP,
                72 => Keys_Adt.Buoy_Prcs,
                65 => Keys_Adt.Blank_Key,
                .
                .
                .
```

Figure 7:
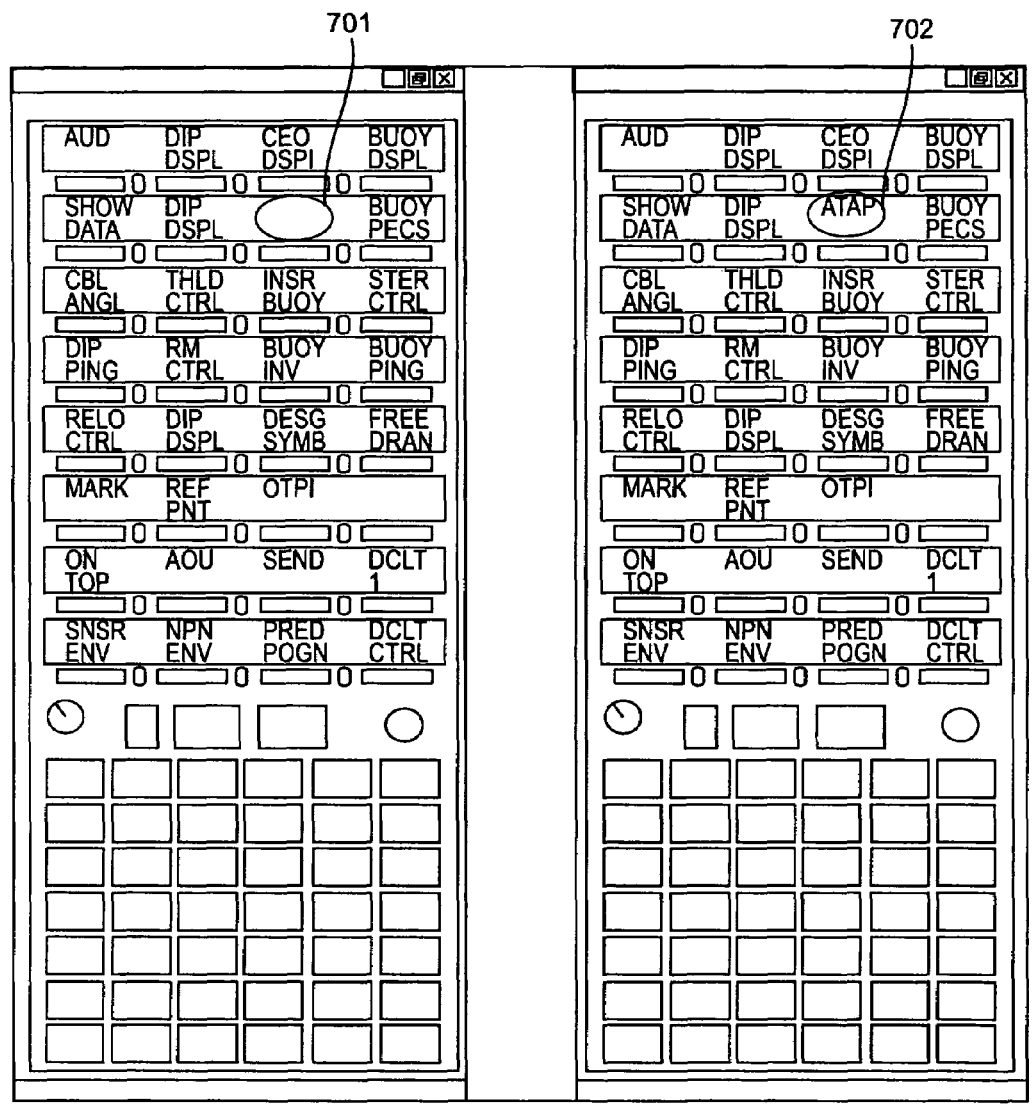
FIG. 7 shows an original and modified keyset.

FIG. 7 shows the difference in keyset appearance based on this change. The original keyset shows a blank key 701, where the modified keyset shows the ATAP key 702. The simulated OSI can then be used for training, demonstration or a repeat of the modification cycle may be performed.

In another alternative embodiment, the updated OSI tables may be used to update the operational OSI in function block 306 or to generate Software Requirement Specification tables in function block 307. In order to update the operational OSI using the modified tables, the simulated OSI text files are read, the data is parsed, and when the appropriate keywords are found, the data is stored internally. Once all the data is read, the internal data is then output in the Ada table format, as described above. In order to generate an SRS table, the simulated OSI text files are read, the data is parsed and when the appropriate keywords are found the data is stored internally. Once all the data is read, the internal data is then output into a table format that is easily imported into a larger document, such as a standard wordprocessor.

In the preferred embodiment of the present invention, the simulated OSI has an extensive help capability to facilitate training of operators. Pop-up HELP for each discrete object on screen is provided. HELP text is populated at initialization from an Engineer modifiable file. Where a key has no apparent result on the MFD or keyset, or where more complex interaction with the MFD is necessary (e.g. interactions involving the hook, contacts, internal format manipulation, etc.), the simulation would display the message: "Key not implemented". Accompanying text would briefly describe the function of the key.

For any keys, selection with the right mouse button causes the display of the text describing the key function. An Engineer modifiable 'STUB file' is used to define all OSI related communication through the AOP Control and Display Interface.

An alternative embodiment implements an open architecture to allow additional AOP code to be extracted and plugged into this program for specific mission modules, to increase the fidelity of the program. Another alternative embodiment expands the simulation to include a basic flight model and fuel management functions in non-mission related areas. Another alternative embodiment allows an operator to record different key presses where the recorded actions saved for later playback, similar to a VCR (video cassette recorder).

While the invention has been described in terms of a single preferred embodiment, those skilled in the art will recognize that the invention can be practiced with modification within the spirit and scope of the appended claims.

The invention claimed is:

1. A method for programming an operator system interface with a simulator, said method comprising the steps of:
   providing, as an input to a computing device other than a computing device providing said operator system interface, definitional tables for said operator system interface, wherein said tables define specific governing attributes of said operator system interface;
   generating an operator system interface simulator program distinct from said operator system interface, wherein, when the simulator program is run on said computing device other than said computing device providing said operator system interface, said simulator program performs display of a representation of the operator system interface defined by the definitional tables input in the providing step and allows a user to select components of the operator system interface, using a pointing device, in order to view information about the selected component on a display device or to effect a change in keysets or menus, thereby modifying said representation of the operator system interface within said simulator program, and
   modifying said definitional tables to correspond to said modifying of said representation to reprogram said operator system interface on said computing device providing said operator system interface.

2. A method as recited in claim 1, further comprising the step of generating tables to be used in a software requirements specification.

3. A method as recited in claim 1, further comprising the steps of:
   generating operational operator system interface definitional tables using the simulated operator system interface definitional tables; and
   developing an operational operator system interface from the generated operational operator interface definitional tables.

4. A method as recited in claim 1, wherein the providing step further comprises the step of extracting the definitional tables from an existing operator system interface.

5. A method as recited in claim 4, further comprising the step of:
   generating updated operational operator system interface definitional tables.

6. A method as recited in claim 4, further comprising the steps of:
   modifying the simulated operational operator system interface; and
   generating updated operational operator system interface definitional tables.

7. A method as recited in claim 5, wherein the steps of generating a simulated operator system interface simulator program, modifying the simulated operator system interface program and generating updated operational operator system interface definitional tables are repeated a desired number of times.

8. A method as recited in claim 1, further comprising the step of running the simulator program on a personal computer.

9. A method as recited in claim 8, wherein the simulator program is used to train operators in a control and display system defined by the operator system interface.

10. A method as recited in claim 8, wherein the simulator program is used to demonstrate functionality of a control and display system defined by the operator system interface.

* * * * *